S. M. CURWEN.
MEANS FOR OPERATING THE STEPS OF PASSENGER CARS.
APPLICATION FILED FEB. 1, 1909.
973,261.
Patented Oct. 18, 1910.
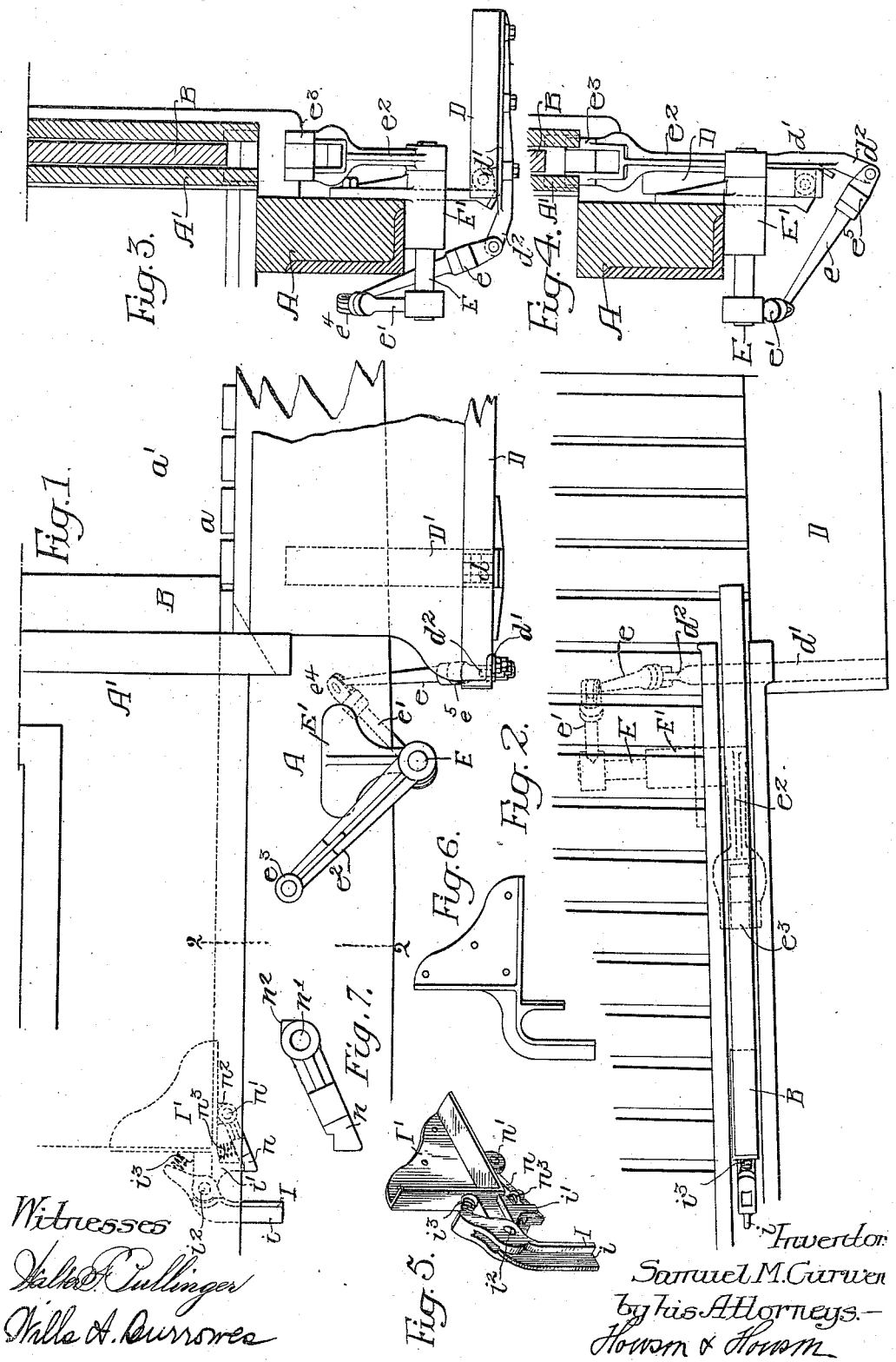
Witnesses
Inventor
Samuel M. Curwen
by his Attorneys,
Howson & Howson

UNITED STATES PATENT OFFICE.

SAMUEL M. CURWEN, OF HAVERFORD, PENNSYLVANIA, ASSIGNOR TO THE J. G. BRILL COMPANY, OF PHILADELPHIA, PENNSYLVANIA, A CORPORATION OF PENNSYLVANIA.

MEANS FOR OPERATING THE STEPS OF PASSENGER-CARS.

973,261. Specification of Letters Patent. Patented Oct. 18, 1910.

Application filed February 1, 1909. Serial No. 475,401.

*To all whom it may concern:*

Be it known that I, SAMUEL M. CURWEN, a citizen of the United States, residing in Haverford, Pennsylvania, have invented certain Improvements in Means for Operating the Steps of Passenger-Cars, of which the following is a specification.

My invention relates to certain improvements in the means for operating the step on the movement of a door of a passenger car.

One object of my invention is to move the step into and out of position on the movement of the car door.

A further object of the invention is to so arrange the step in respect to the sliding door at the side of the platform of a car that when the door is full open the step is entirely independent of the door.

My invention also relates to details of construction fully described hereafter.

In the accompanying drawings:—Figure 1, is a side view of sufficient of a platform of a passenger car to illustrate my invention, showing the door open and the step down in position; Fig. 2, is a sectional plan view on the line 2—2, Fig. 1; Fig. 3, is a transverse sectional view showing the step in position as in Fig. 1; Fig. 4, is a similar view showing the step out of position; Fig. 5, is a perspective view of the engaging member carried by the door; Fig. 6, is a view of a modification of the engaging member; and Fig. 7, is a detached view of the tappet.

While my invention can be applied to any passenger car it relates particularly to the door and step at the forward end of a passenger car of the type in which the passengers pay their fares on entering the car. In this type of car there is an exit doorway at the front platform closed by a sliding door, and in order to prevent persons standing on the step at this doorway when the door is closed, I pivot the step and so arrange the parts that when the door is closed the step will be turned upon its pivot out of position and when the door is open, the step will be lowered into position. During a portion of the movement of a car door the step is not connected with the door so that the step is raised only during the last portion of the closing movement of the door and is lowered into position immediately on opening the door so that a passenger cannot alight from the car unless the step is first in position.

A is the frame of a platform of a car.

B is a sliding door adapted to a channel in the partition A′ and arranged to close the doorway $a'$. The door is connected to operating means within easy reach of the motorman, as it is the duty of the motorman to operate this door when passengers wish to alight from the car at the forward end.

D is the step pivoted in the present instance at $d$ to a bracket D′ hung from the frame A of the car directly under the doorway $a'$. Secured to one edge of the step is a plate $d'$ having an extension $d^2$ projecting rearwardly of the pivot $d$. This extension is connected by a link $e$ to an arm $e'$ on a rock shaft E pivoted to the bracket E′ attached to the frame A of the car. In order to allow the link $e$ and arm $e'$ to accommodate themselves to the irregular movement I mount a swiveled head $e^4$ on the end of the arm, and make a swiveled head $e^5$ on the link $e$ as shown. On the shaft E is an arm $e^2$ forked at its outer end in the present instance and provided with a roller $e^3$. This arm projects in the path of the engaging member I secured to the rear lower corner of the door B. This engaging member has two arms $i$ and $i'$ forming a pocket for the reception of the roller $e^3$. As the door is moved to its closed position it travels some distance before the arm $i$ strikes the roller $e^3$. The door is preferably closed to such an extent that a passenger cannot pass through the doorway when the arm $i$ reaches the roller $e^3$, thus preventing any accident during the movement of the step into and out of position. As the movement of the door is continued the arm $i'$ will be moved forward turning the rock shaft E and as this rock shaft is connected to the step by the link $e$ and the arms $e'$ and $d'$, it will turn the step on its pivot from the position shown in Fig. 3 to the position shown in Fig. 4, the roller in the meantime entering the pocket between the two arms $i$ and $i'$. On the opening of the door the arm $i'$ pushes against the roller $e^2$ turning the rock shaft E in the opposite direction and immediately moving the step from the position shown in Fig. 4 to that shown in Fig. 3, before the door is open sufficiently to allow a passenger to leave the car. The arms $i$, $i'$ may be the fixed parts of the engaging member as shown in Fig. 6, but I prefer to make them yielding, as shown in Fig. 5 so that when the door is opened or closed shocks due to the opening and closing of the door will be considerably reduced. The arm $i$ is pivoted at $i^2$ to the frame I' and between an extension of this arm and the frame is a spring $i^3$ so that when the arm strikes the roller $e^3$ the spring will yield to a certain extent cushioning the bolt. In order to cushion the roller when the engaging member first strikes it, I provide a yielding inclined tappet $n$ pivoted at $n'$ and having a stop $n^2$ to limit its downward movement. A spring $n^3$ is mounted between the tappet $n$ and the frame I' so that as the tappet strikes the roller it will yield. The end of this tappet is in a line with the arm $i'$ of the engaging member and thus forms an extension of said arm to allow the arm $e^2$ to move to turn the rock shaft E a greater distance than if it were simply a rigid part of the fixture, as shown in Fig. 6. Thus it will be seen that when the step is lowered into position and the door open the step and door are entirely independent so that any movement of the door, unless it is closed to such a position that it is impossible for any one to alight from the car will not affect the position of the step. This is important, especially in street passenger cars where accidents often happen due to the fact that persons frequently alight from the car before it comes to a full stop, and where a door is connected at all times with the step any movement of the door, no matter how slight, will affect the position of the step.

By the arrangement above described when the door is closed the step will be positively raised and held in the raised position by the door as the arm $e^2$ is held by the arms $i$ on the door and when the door is opened the step is lowered. The step can be raised independently of the door if it happens to be projecting beyond the line of the car and if for any reason it is desired to raise the step to clear any obstruction.

The device is readily applied and in the event of any repairs, these can be quickly made. The parts are simple and do not easily get out of order.

The device can be applied to either or both sides of any car platform and it may be used with a gate in place of the sliding door shown without departing from the essential features of the invention.

In the event of the step being raised without operating the door, the door can be closed when the tappet $n$ is used, as the tappet will yield when it strikes the roller $e^3$ and ride over it, and when the door is again opened it will operate the step.

I claim:

1. The combination of a movable step in front of a doorway, a sliding door for closing said doorway, lever mechanism entirely independent of the door and connected to the step for shifting the step into and out of position, with means fixed to the door for engaging the lever mechanism so as to move the step out of position as the door is closed.

2. The combination in a car having a doorway at the side of the platform, a pivoted step mounted at the doorway, a sliding door for closing said doorway, lever mechanism connected to the step, an operating device secured to the rear of the sliding door and so arranged as to come in contact with the lever mechanism as the door is closed to turn the step out of position and to actuate the lever mechanism to throw the step into position as the door is opened.

3. The combination of a car having a doorway at the side of the platform, a step pivotally mounted below the doorway, a rock shaft mounted in bearings on the car, said rock shaft having two arms, a lever connecting one of said arms with a projection at the rear of the step, a sliding door, an operating device, the other arm of the rock shaft extending into the path of the operating device so that as the door is opened or closed the step will be moved into and out of position.

4. The combination of a pivoted step mounted below a doorway, a sliding door adapted to close said doorway, a rock shaft connected to the step and having an arm, an operating device on the door adapted to move said arm, said actuating device having two arms forming a pocket between them into which the arm of the rock shaft extends when the door is in the position to actuate the step.

5. The combination of a movable step mounted under a doorway, a sliding door adapted to close said doorway and having an operating device attached thereto, a rock shaft connected to the step and having an arm projecting in the path of the operating device on the door, said operating device having two arms, one of said arms being yieldingly connected to the arm of the operating device.

6. The combination in a step mounted below a doorway, a sliding door adapted to close said doorway, an operating device secured to the door, a rock shaft having two arms, one arm being connected to the step and the other arm projecting into the path of the operating device, said operating device consisting of two arms forming a pocket between them into which the arm of the rock shaft extends, the longer arm of the two being pivotally connected to the frame of the operating device, and a spring mounted between an extension of the arm and the frame, an inclined tappet yieldingly mounted on the frame, said tappet first striking the arm of the rock shaft as the door is closed, the other arm being arranged to positively move the step out of position.

7. The combination in a passenger car, having a doorway at one side of the platform, of a step pivotally mounted under the doorway, a sliding door adapted to close said doorway and having an operating device attached to its lower rear corner, a rock shaft adapted to bearings on the frame of the car, said rock shaft having two arms, a plate on the step having a rearward extension, a link connecting said extension with one of said arms of the rock shaft, the other arm of the rock shaft having a roller at its outer end arranged in the path of the operating device on the door, said operating device having two arms, one fixed and the other yieldingly mounted, said yieldingly mounted arm extending below the fixed arm and adapted to engage the roller as the door is being closed, the other arm engaging the roller as the door is being opened, and a yielding, inclined tappet carried by the operating device in front of the fixed arm.

In testimony whereof, I have signed my name to this specification, in the presence of two subscribing witnesses.

SAMUEL M. CURWEN.

Witnesses:
 JOHN H. OHLSSON,
 HENRY C. ESLING.